United States Patent [19]
Flesher et al.

[11] Patent Number: 4,599,379
[45] Date of Patent: Jul. 8, 1986

[54] PROCESS FOR THE PRODUCTION OF POLYMERS AND AQUEOUS SOLUTIONS THEREOF

[75] Inventors: Peter Flesher; David Farrar; Alan C. Benson, all of West Yorkshire, England

[73] Assignee: Allied Colloids Ltd., England

[21] Appl. No.: 692,277

[22] Filed: Jan. 16, 1985

[30] Foreign Application Priority Data

Jan. 17, 1984 [GB] United Kingdom ............... 8401206

[51] Int. Cl.$^4$ ............................................. C08J 3/02
[52] U.S. Cl. ................................... 524/801; 523/337
[58] Field of Search ........................ 523/337; 524/801

[56] References Cited

U.S. PATENT DOCUMENTS 4,021,399 5/1977 Hunter .............................. 524/801
4,052,353 10/1977 Scanley ............................ 524/801

Primary Examiner—Paul R. Michl
Attorney, Agent, or Firm—Lawrence Rosen

[57] ABSTRACT

A stable, water dispersable, substantially anhydrous disperson of water soluble or water swellable polymer particles in water immiscible liquid is made by reverse phase suspension polymerization and dehydration of the dispersion and is rendered dispersable in water by the addition of an oil soluble surfactant having HLB above 7.

10 Claims, No Drawings

PROCESS FOR THE PRODUCTION OF POLYMERS AND AQUEOUS SOLUTIONS THEREOF

It is accepted that it is difficult to mix fine, water soluble, dry polymeric powder into water in such a way as easily to obtain a dilute aqueous solution, because of the risk of aggregation of the polymer particles upon contact with water. To avoid this problem, it is common to add the polymer to the water while the polymer is present in particulate form in a dispersion in a water immiscible liquid (referred to below as an oil).

Various ways are known for making liquid dispersions in oil of particles comprising polymer. For instance in U.S. Pat. No. 3,122,203 Hawkins proposes adding preformed polymer particles to oil, without deliberate water addition. In U.S. Pat. No. 3,734,873 Anderson proposes adding preformed polymer particles to a water-in-oil emulsion in the presence of oil soluble emulsifier that will stabilise the water-in-oil emulsion and that has low HLB and that is present normally in an amount of from 12 to 20% by weight of the oil.

The dispersions can also be made by what are now termed "reverse phase polymerisation processes" in which aqueous monomer is dispersed in oil and is polymerised in the dispersion. There are two main processes of this type, reverse phase emulsion polymerisation and reverse phase suspension polymerisation and they both lead to a dispersion which can be termed an emulsion.

In a reverse phase emulsion polymerisation process, the initial dispersion of aqueous monomer droplets in oil is formed in the presence of water-in-oil emulsifier (of low HLB) that is present in a concentration sufficient that micelles of emulsifier are formed in the oil phase. Monomer migrates from the original aqueous monomer droplets into these micelles and polymerisation occurs primarily within the micelles. The amount of low HLB emulsifier that has to be present, in order for the micelles to exist, is always high, always being well above 5%, and usually above 10%, for instance 10 to 15 or even 20%, by weight based on the oil. The size of the final aqueous polymer droplets depends primarily on the amount of low HLB emulsifier.

In reverse phase suspension polymerisation processes the polymerisation occurs primarily within the initial aqueous monomer droplets and the size of the final aqueous polymer droplets depends primarily on the size of these initial aqueous monomer droplets. They may be formed, and the polymerisation may be conducted, in the total absence of low HLB emulsifier but it is usually convenient to include a small amount of low HLB emulsifier in order to facilitate the formation of small aqueous monomer droplets, and therefore a final emulsion having small aqueous polymer particles. Generally the amount of low HLB emulsifier is below 2% by weight based on the total dispersion or below 3, or at the most 4, % by weight based on the oil. Generally the process is conducted in the presence of a polymeric polymerisation stabiliser, for instance one of the materials described in GB No. 1,482,515.

An early disclosure of reverse phase emulsion polymerisation processes is by Van Der Hoff in U.S. Pat. No. 3,284,393 whilst an early disclosure of reverse phase suspension polymerisation processes is by Friedrich in U.S. Pat. No. 2,982,749.

The polymer-in-oil dispersions made by these various techniques and that can be mixed into water contain a substantial amount of water, the particles containing polymer being particles of aqueous polymer gel, but it is known to convert the dispersions into substantially anhydrous form, for instance by azeotropic distillation. This is described in, for instance, U.S. Pat. No. 4,052,353 and GB No. 1,499,731.

The typical disclosures of the addition of polymer-in-oil dispersions to water involve the use of dispersions containing large amounts of low HLB emulsifier. For instance Anderson in U.S. Pat. No. 3,734,873 describe the use of 12 to 20% by weight low HLB emulsifier based on the weight of oil and, as a description of reverse phase polymerisation, mentions only Van Der Hoff U.S. Pat. No. 3,284,393, which uses typical, high, contents of emulsifier. Similarly, Scanley in U.S. Pat. No. 4,052,353 again refers to Van Der Hoff U.S. Pat. No. 3,284,393. In GB No. 1,499,731 the use of 5 to 20% by weight, based on the oil phase, low HLB emulsifier is recommended and in the examples above 10% is used.

As the oil is immiscible with the water it is normal to conduct the mixing in the presence of a high HLB surfactant that will promote distribution of the dispersion into water, thereby exposing the particles comprising polymer to the water, so as to permit dissolution.

The standard document to which reference would be made when selecting a surfactant for any particular purpose is "The Atlas HLB System" published by Atlas Chemical Industries Inc. In the volume copyright 1963 reference LD-97-RI-3M-7-69 on page 4 it is stated that "you will use a water soluble emulsifier or blend to make an oil-in-water emulsion" and "you use a water soluble emulsifier when you want your final product to exhibit aqueous characteristics, i.e. to dilute readily with water. For these purposes you would rarely use an oil soluble emulsifying system". Prior art concerned with high HLB surfactants for distributing polymer-in-oil dispersions into water always recommends water soluble surfactants as oil-in-water emulsifiers.

For instance Anderson in U.S. Pat. No. 3,734,873 recommends water soluble high HLB surfactants and substantially all his numerous examples appear to be water soluble with a possible single exception in that he proposes the use of an octyl phenol condensate with 3 moles of ethylene oxide for activating a dispersion apparently made by dispersing preformed polymer particles into a water-in-oil emulsion containing, presumably, 12 to 20% low HLB emulsifier, based on the weight of oil. Anderson recommends the use of 0.01 to 50%, often 1 to 10%, high HLB surfactant based on the weight of polymer and in the only example used 5% (giving 105% total emulsifier based on polymer or 21% based on non-aqueous components).

Scanley in U.S. Pat. No. 4,052,353 refers only to the use of water soluble high HLB surfactant and recommends the use of 0.1 to 20%, preferably 1 to 15% based on the weight of oil and in his examples uses from 4 to 12% based on total composition. In GB No. 1,499,731 the use of 5 to 20% of the water soluble high HLB surfactant is recommended.

In general practice, the amount of high HLB surfactant has to be greater than the amount of low HLB surfactant and has to be sufficient to provide the desired distribution into oil.

The present systems suffer from several disadvantages.

The first is that the incorporation of the high HLB water soluble surfactant in the polymer-in-oil dispersion is liable to promote instability, for instance as discussed by Anderson in U.S. Pat. No. 3,734,873 and by Scanley in U.S. Pat. No. 4,052,353.

Secondly, the systems all necessarily involve the use of large amounts of water soluble surfactant.

Thirdly, all this water soluble surfactant necessarily goes into the aqueous polymer solution that is being made, with possible risk of pollution effects.

In the invention we can overcome these problems. We find that if the polymer-in-oil dispersion is made by reverse phase suspension (as opposed to emulsion) polymerisation and is then dehydrated, an oil soluble surfactant can very effectively be used as the activator, the total amount of this oil soluble surfactant can be low, the total amount of oil soluble surfactant necessary for facilitating the reverse phase suspension polymerisation can also be very low, and the system can be free of water soluble surfactant.

In the invention a stable, water dispersable, substantially anhydrous dispersion of water soluble or water swellable polymer particles in water-immiscible liquid is made by polymerising aqueous polymerisable monomer dispersed in water-immiscible liquid by reverse phase suspension polymerisation to form a dispersion of aqueous polymer particles dispersed in water-immiscible liquid, dehydrating this dispersion and, before or after the dehydration, adding an oil soluble surfactant that has a solubility in the water immiscible liquid at 20° C. of at least 1 part in 9 parts of the liquid and that has HLB at least 7 and that will promote distribution of the dehydrated dispersion into water.

For some purposes, best results are achieved by the use of a surfactant that is water dispersible or that has some solubility in water but the surfactant should always more soluble in oil than water, in order that it partitions preferentially into the oil phase, and so can be separated with the oil if necessary. When, as is often the case, it is desired that the resultant aqueous system should be free of dissolved surfactant the oil soluble surfactant should be insoluble in water, that is to say it should have a solubility at 20° C. in water of less than 1 part in 100 parts water.

An important advantage of using an oil soluble high HLB surfactant with the dehydrated dispersion is that it is possible to obtain good distribution into water using much less surfactant than is required when the surfactant is water soluble. Although Scanley in U.S. Pat. No. 4,052,353 requires the use of water soluble surfactant in his dehydrated dispersions, it now appears to us that a substantial amount of the water soluble surfactant goes immediately into the dilution water and so has little or no effect in promoting distribution of the substantially dry polymer particles and oil into the dilution water. In the invention the surfactant remains available to promote distribution and so lower amounts are required to achieve equivalent distribution effectiveness.

The reverse phase suspension polymerisation process may be conducted by dispersing an aqueous solution of polymerisable monomer into the non-aqueous liquid in the presence of polymeric polymerisation stabiliser, and, optionally, a small amount of an oil soluble, low HLB emulsifier.

Suitable suspension stabilisers include amphiphatic copolymers of hydrophobic monomers with hydrophilic monomers and which are soluble or dispersible in liquids of low polarity. The preferred stabilisers are either completely soluble or form fine dispersions in the continuous phase but are substantially insoluble in the monomer solution. These are typified by copolymers of alkyl acrylates or methacrylates with acrylic or methacrylic acid and copolymers of alkyl acrylates or methacrylates with dialkyl aminoalkyl-(generally dimethyl aminoethyl)-acrylate methacrylate or quaternary ammonium or acid salt derivatives of these amino monomers. The most suitable of these are copolymers of alkyl methacrylates, where the alkyl group is a linear hydrocarbon of 12–18 carbon atoms, with methacrylic acid or trimethyl-beta-methacryloxyethyl-ammonium chloride and terpolymers with methyl methacrylate and hydroxyethylacrylate. Suitable materials are described in BP No. 1,482,515, U.S. Pat. No. 4,339,371 and EP No. 126528.

The choice of stabiliser is influenced by the particular homopolymer or copolymer being manufactured. The stabilisers for polymers containing acrylic acid or its sodium salt are preferably cationic and those for polymers containing dimethyl amino methyl acrylate or its salts or quaternary ammonium derivatives, or other cationic polymers, are preferably anionic.

The amount of suspension polymerisation stabiliser used is dependent on the size range of polymer particles required because at least a mono-layer absorbed at the interface between the polymer particle and the continuous phase is required to stabilise the dispersion both during polymerisation and during azeotropic distillation. Generally the amount of stabiliser is from 0.05 to 10%, preferably 0.5 to 5%, based on the weight of the aqueous dispersion when, as is preferred, the particle size is to be small, for instance below 5 microns and generally in the range 0.2 to 2 or 3 microns. Based on non-aqueous components, the amount may be up to 15%. If larger particles are satisfactory then lower amounts of stabiliser, for instance 0.01 to 0.5%, may be satisfactory.

The aqueous monomer droplets may be produced solely by the application of shear to a mixture of the aqueous monomer and the oil and stabiliser, but it is often convenient to include a small amount of a water-in-oil, low HLB, emulsifier so as to reduce the amount of shear that has to be applied to achieve a given particle size. The low HLB emulsifier will have HLB below 7, and generally 4 to 6 and typical emulsifiers are sorbitan monostearate, sorbitan monooleate, glyceryl monostearate and various ethoxylated fatty alcohols. They are usually soluble in the oil. The amount of low HLB emulsifier is preferably below 1.5% or 2%, typically 0.1 to 0.8% by weight based on the weight of the aqueous monomer dispersion in oil, or below 2%, or at the most 3%, on non-aqueous components in the dispersion.

The water immiscible liquids preferably consist solely of hydrophobic water immiscible liquid such as aromatic and aliphatic hydrocarbons and halogenated hydrocarbons. In EP No. 126528 (not published at the priority date of this application) it was proposed to reduce the amount of required oil-in-water emulsifier by incorporating with the water immiscible liquid certain polar liquids and for many purposes it is preferred that the water immiscible liquid, and the dispersion, is free of any of the polar liquids proposed in EP No. 126528.

The monomers that can be used in the invention, and the polymers that can be produced, can be any of those discussed in, for instance, U.S. Pat. No. 3,734,873, U.S. Pat. No. 4,052,353 and EP No. 126528. The monomers are preferably water soluble ethylenically unsaturated monomers, especially acrylamide and other acrylic monomers such as dialkylaminoalkyl acrylate or methacrylate, generally as acid addition or, preferably, quaternised salts thereof or acrylic acid salts.

Polymerisation may be induced by the use of a water soluble initiator in known manner. The aqueous dispersions of monomer or polymer in oil generally contain 20 to 60% by weight oil, 15 to 50% by weight polymer or monomer and 15 to 50% by weight water.

The aqueous polymer dispersion may be dehydrated in known manner, generally by azeotropic distillation, preferably under reduced pressure, the dehydration being conducted for a sufficient time that the final product is substantially anhydrous. Thus the water content in the polymer particles will be below 25% and generally below the ambient moisture content of the particles if they were exposed to the atmosphere, i.e. generally below 10% by weight. The water immiscible liquid in the initial aqueous dispersion is usually a blend of volatile and non-volatile oils, the volatile oil being removed during the azeotropic distillation. It may be replaced by further water immiscible liquid.

The high HLB surfactant may be added before the dehydration step but is usually added after the dehydration. The amount of activator can be up to about 15% by weight of the non-aqueous dispersion but preferably is less, generally from 0.1 to 10%, preferably 1 or 2% up to 5%, with best results generally being obtained with less than 3% activator. The optimum amount will depend upon the components of the polymer dispersion and upon the particular activator being used and its intended use.

The HLB of the oil soluble surfactants is always above 7 and is generally below 11.5, most preferably 8 to 11.5, especially 9 to 10.7. The surfactant is generally a non-ionic surfactant.

The surfactant must be selected such that is has the required HLB and the required solubility characteristics, for instance by choice of an appropriate degree of ethoxylation. Suitable materials are commercially available but many high HLB surfactants are unsatisfactory.

Examples of classes of surfactants from which the selection may be made include ethylene oxide propylene oxide block copolymers, alkylene (generally ethylene) oxide condensates of alkyl phenols or fatty alcohols, and polyalkylene (generally ethylene) glycol condensates of fatty acids. Suitable materials are ethylene oxide condensates of octyl phenol or nonyl phenol, ethylene oxide condensates of fatty alcohols such as blends of cetyl and oleyl alcohol or $C_{9-11}$ alkyl alcohols, polyethylene glycol 200, 300 or 400 oleates or the isopropylamine salt of dodecyl benzene sulphonate. Particularly suitable materials are the condensates of nonyl phenol with about 5.5 moles ethylene oxide and of a synthetic middle fraction primary alcohol with about 4.5 moles ethylene oxide. Suitable materials are sold under the trade names Ethylan 55 and Ethylan B254. Blends may be used, for instance of these two particular materials typically in amounts in the ratios 3:1 to 1:3.

If a water and oil soluble surfactant is required, an example is the condensate of about 5 moles ethylene oxide with a $C_{13}$ fatty alcohol.

The process of the invention results in the formation of novel products and these form a further part of the invention. According to the invention we provide a water dispersable, substantially anhydrous, dispersion of water soluble or water swellable polymer particles in a water immiscible liquid wherein the particles have a size of less than 5 microns, the dispersion includes 0 to about 3% by weight water-in-oil, low HLB, emulsifier and 0.01 to about 15% by weight polymerisation, polymeric stabiliser, and the dispersion includes 0.1 to 15% by weight of the defined oil soluble surfactant Preferably the amounts of low HLB surfactant is below 2%. Preferably the amount of high HLB oil soluble surfactant is below 5%, preferably below 3%. Preferably the dispersion is free of water soluble surfactant. Preferably the total amount of surfactant is below 6%, preferably below 3% or 4%. These percentages are all based on the dehydrated dispersion weight. The cumulative HLB of all the surfactants in the dispersion is preferably 7 to 9, most preferably 7.5 to 8.

The invention is of particular value in the production of dispersions of water soluble polymer as these can be used to form dilute aqueous solutions of the polymer, for instance as flocculants for organic or inorganic slurries, but the invention is also useful for the production of aqueous dispersions of water swollen, water insoluble, polymer particles, for which purpose the polymerisable monomers will include a small amount of a water soluble cross-linking agent, in conventional manner.

The following are some examples:

EXAMPLE 1

A polymer in oil dispersion may be prepared by reverse phase suspension polymerisation in conventional manner. For instance about 25 parts of a blend of approximately equal amounts of acrylamide and quaternised dimethylaminoethyl acrylate may be dissolved in about 25 parts water and the solution dispersed in about 40 parts of equal amounts of a blend of volatile and non-volatile oils (Shell SBP11 and SPO60) in the presence of about 0.5 parts SPAN 80 and about 1.5 parts of a 2:1 copolymer of stearyl methacrylate-methacrylic acid or other suitable copolymer as described in GB No. 1,482,515. Shear may be applied until a particle size of about 1 to 2 microns is achieved, the system may then be deoxygenated and polymerisation induced using tertiary butyl hydroperoxide and sulphur dioxide in conventional manner. After the exotherm is completed pressure may be reduced and water and volatile oil may be removed by azeotropic distillation to give a substantially dry product containing about 55% by weight polymer 0.2 to 2 microns in size and about 45% by weight oil.

About 1.5 parts by weight (based on the total weight of dry dispersion) of a blend of Ethylan 55 and Ethylan D254 is added by simple mixing. Upon mixing the resultant composition into water, the polymer particles rapidly dissolve to form a dilute aqueous solution which can be used in conventional manner, e.g. as a flocculant.

In similar manner the following activator, oil soluble, water insoluble, surfactants were used with equivalent success:

$C_{9-11}$ alkyl alcohol condensate with about 3 moles ethylene oxide—HLB 8.8 (Ethylan C913).

Cetyl/oleyl alcohol condensate with 3 moles ethylene oxide—HLB 7.0 (Ethylan 172).

Octyl phenol condensate with about 4 moles ethylene oxide HLB 9.0 (Ethylan ENTX).

Polyethylene glycol 200 oleate—HLB 7.0 (Ethylan A2).

Polyethylene glycol 300 oleate—HLB 8.9 (Ethylan A1).

Polyethylene glycol 400 oleate—HLB 10.3 (Ethylan A4).

Ethylene oxide propylene oxide block copolymers sold under the trade names Monolan P222, 1206/2 and 2000E/12.

Ethylan and Monolan are trade marks.

EXAMPLE 2

In a similar manner there is made by reverse phase suspension polymerisation followed by azeotropic distillation 50 grams of an anhydrous polymer dispersion in Pale Oil 150 containing 52.5% by weight of an acrylamide/sodium acrylate copolymer of weight ratio 60:40, intrinsic viscosity 18.5 dl.gm$^{-1}$ and average particle size 0.94 microns. This was blended with 2.5 parts of Ethylan 172 (a 3 mole ethoxylate of cetyl-oleyl alcohol at HLB 7.0) to produce a 50% active polymer dispersion which is self emulsifiable in water. A similar blend was prepared using Ethylan A2 (polyethylene glycol molecular weight 200 mono-oleate of HLB 7.0) in place of Ethylan 172 to produce a self emulsifiable dispersion.

It appears that the use of our oil soluble, preferably water insoluble, surfactants is unsatisfactory when the dispersion is made by reverse phase emulsion polymerisation and, in particular, it is impossible to obtain satisfactory dispersability in water by the use of the low amounts, generally below 5% and preferably below 3%, by weight of the high HLB surfactant that are preferred in the invention.

If the examples given above are repeated using water soluble, oil insoluble, high HLB surfactant there is sometimes a tendency for the dispersion to be less stable but, in particular, the resultant polymer solution always contains dissolved activating surfactant, and this is undesirable.

If the examples are repeated without the dehydration stage the solids content of the dispersion is inevitably much less, typically around 30% instead of around 50% by weight, and this is very undesirable. By the invention we produce, for the first time, a dispersion that has high solids content and that can be mixed into water without risk of polluting the resultant aqueous solution with dissolved surfactant.

We claim:

1. A process in which a stable, water dispersable, substantially anhydrous dispersion of water soluble or water swellable polymer particles in water-immiscible liquid is made by polymerising aqueous polymerisable monomer dispersed in water-immiscible liquid by reverse phase suspension polymerisation to form a dispersion of aqueous polymer dispersed in water-immiscible liquid, dehydrating this dispersion and, before or after the dehydration, adding an oil soluble surfactant that has a solubility at 20 degrees C. in the water-immiscible liquid of at least 1 part per 9 parts by weight of the liquid, that has a solubility at 20 degrees C in water of less than 1 part per 100 parts by weight water, that has HLB at least 7 and that will promote distribution of the dehydrated dispersion into water.

2. A process according to claim 1 in which the oil soluble surfactant is added after the dehydration.

3. A process according to claim 1 in which the amount of the oil soluble surfactant is from 0.1 to 15% by weight of the dispersion and the dispersion is free of surfactant that has a solubility in water of greater than 1 part per 9 parts by weight water at 20° C.

4. A process according to claim 1 in which the amount of oil soluble surfactant is from 1 to 5% by weight of the anhydrous dispersion.

5. A process according to claim 1 in which the dispersion of aqueous polymerisable monomer is formed in the presence of 0.01 to 10%, based on the weight of dispersion, of polymeric polymerisation stabiliser and 0 to 2%, based on the weight of aqueous dispersion, of water-in-oil emulsifier having HLB below 7.

6. A process according to claim 1 in which the dispersion of the aqueous polymerisable monomer in the water immiscible liquid is formed in the presence of from 0.1 to 1.5% water-in-oil emulsifier having HLB below 7, and in the presence of 0.5 to 5% by weight polymeric polymerisation stabiliser, both percentages being by weight of the aqueous dispersion, and the size of the polymer particles is below 5 microns.

7. A process according to claim 1 in which the amount of the oil soluble surfactant is from 1 to 3% by weight of the anhydrous dispersion and the total amount of surfactant in the final dispersion is below 6%.

8. A process according to claim 1 in which the HLB of the oil soluble surfactant is from 9 to 10.7.

9. A process according to claim 1 in which the polymerisable monomers are selected from acrylamide, water soluble salts of acrylic acid and dialkylaminoalkyl acrylates and methacrylates and their acid addition and quaternary ammonium salts.

10. A process according to claim 1 in which the polymer is water soluble.

* * * * *